Figure 1:
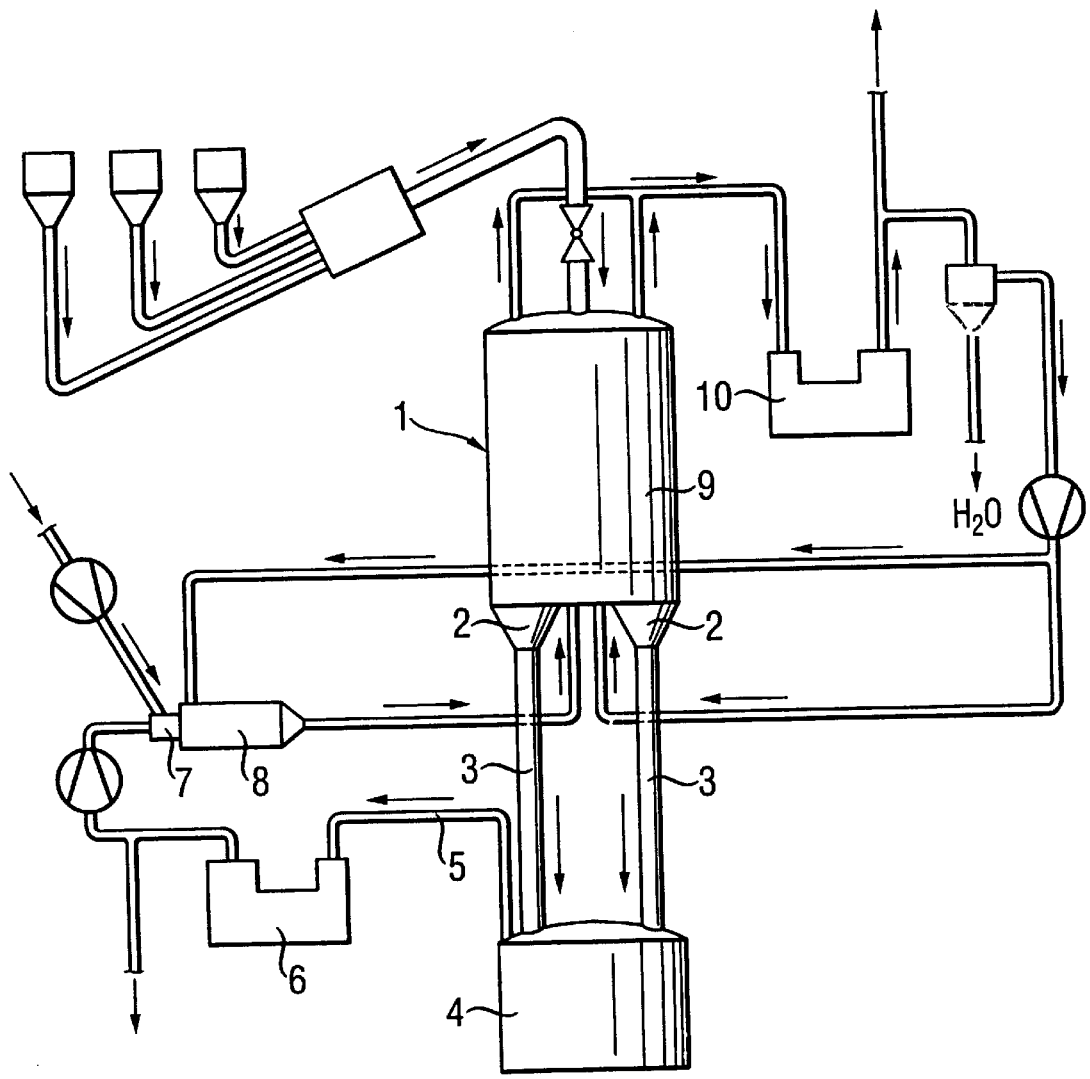

United States Patent

Honkaniemi et al.

[11] Patent Number: 6,099,301
[45] Date of Patent: Aug. 8, 2000

[54] FEED APPARATUS FOR BATCH PREPARATION FEED MIXTURE FOR FEEDING INTO SMELTING FURNACE

[75] Inventors: Matti Elias Honkaniemi; Pekka Juhani Niemelä, both of Turin, Finland; Risto Markus Heikkilä, Värnamo, Sweden; Martti Johannes Jankkila, Turin; Launo Leo Lilja, Pori, both of Finland

[73] Assignee: Outokumpu Oyj, Finland

[21] Appl. No.: 09/320,478

[22] Filed: May 26, 1999

[30] Foreign Application Priority Data

Jun. 15, 1998 [FI] Finland .................................. 981389

[51] Int. Cl.⁷ .................................................. F27B 15/00
[52] U.S. Cl. ............................ 432/58; 432/14; 432/99; 432/101; 110/245
[58] Field of Search .......................... 432/14, 15, 58, 432/99, 101, 121; 110/245

[56] References Cited

U.S. PATENT DOCUMENTS

| | | | |
|---|---|---|---|
| 3,074,706 | 1/1963 | Schmid et al. | 432/14 |
| 4,402,665 | 9/1983 | Korenberg | 431/170 |
| 4,545,959 | 10/1985 | Schilling et al. | 22/143 |
| 4,628,834 | 12/1986 | McKelvie | 110/263 |
| 4,708,640 | 11/1987 | Honkaniemi et al. | 432/14 |
| 4,817,563 | 4/1989 | Beisswenger et al. | 122/4 D |
| 4,841,884 | 6/1989 | Engstrom et al. | 110/298 |
| 5,370,084 | 12/1994 | Skowyra et al. | 122/4 D |
| 5,453,251 | 9/1995 | Vidal et al. | 422/145 |
| 5,682,827 | 11/1997 | Nagato et al. | 110/244 |
| 5,738,511 | 4/1998 | Borah et al. | 432/95 |

*Primary Examiner*—Denise L. Ferensic
*Assistant Examiner*—Jiping Lu
*Attorney, Agent, or Firm*—Morgan & Finnegan, L.L.P.

[57] ABSTRACT

Feed apparatus for treating and feeding lumpy or granular material to a smelting furnace, which apparatus contains a plurality of silos or sub-silos in which said material is contacted with a gas. The silo or sub-silo contains a cone-shaped gas distributor located in the middle of the bottom portion of the silo. The gas distribution cone has a number of gas nozzles, preferably between 100 and 500 gas nozzles.

12 Claims, 5 Drawing Sheets

FEED APPARATUS FOR BATCH PREPARATION FEED MIXTURE FOR FEEDING INTO SMELTING FURNACE

The present invention relates to a feed apparatus, with which a feed mixture composed of different batch components is prepared and fed to a smelting furnace such as an electric furnace. The feed apparatus consists of one or more silos with an upwardly narrowing gas distribution cone in the bottom part of the silo and the gas is channelled into the furnace through the nozzles of the distribution cone. The feed mixture in the silo is heated and dried using this feed gas.

A well-known method in the prior art has been to feed the raw material into the electric furnace via hoppers and silos by means of pipes, which pass through the furnace roof to the inside of the furnace. Another method of the prior art is to feed and preheat granular feedstock utilizing gas, which is burned either inside or outside the furnace, eg on the basis of U.S. Pat. No. 3,459,411.

The feed silo for the smelting furnace, consisting of several sub-silos is described for example in U.S. Pat. No. 4,708,640. In this arrangement, the feed silo is uniform at the upper part and divided into several sub-silos in the lower part. The sub-silos are connected to the smelting furnace via ducts. An uniform gas distribution chamber is located in the middle of the sub-silos, from which the gases are channelled along the distribution ducts extending to the sub-silos, as illustrated for example in patent FIGS. 3 and 5. A small amount of gas can also be conducted directly into the upper part of the sub-silo without the distribution duct. The gases are discharged at the top of the feed silo.

Although the previously described arrangement is practical, it does however have some weaknesses. The penetrability of the gas into the bed is dependent on the resistance of the bed. In other words, gas will spread in the easiest way through the bed to its surface. It is known that extensive empty spaces may form near the walls of the silo and the danger is that gas flows entering near the wall will be conducted just to these spaces. The easiest route for the gas after this is along the wall up due to the small resistance of this section of the bed. Gas fed via distribution ducts enters always from the walls of the sub-silo, which causes empty spaces (cavitation) in the bed material being fed into the smelting furnace. It is possible to feed some of the gas from above the distribution ducts, but in this case too the feed will be inwards from the wall of the sub-silo. The other problem is blockage and damage of the nozzle holes. In the arrangement described, it is difficult to clean and repair the holes, since it would require the entire silo to be emptied and the shutdown of the process up to the smelting furnace. One of the drawbacks of the previously described procedure is that because the gas distribution chamber is located in the middle of the sub-silos, this part of the silo's capacity is redundant.

According to the present invention, a feed apparatus has been developed, whereby the feedstock is pretreated in either one or several feed silos. If there is only one feed silo, its lower section consists of several, preferably at least three sub-silos, connected at the bottom to the smelting furnace feed ducts. In large-volume smelting furnaces in particular, instead of a single uniform silo, several different silos can be used, whose lower parts are connected to one or more feed ducts. Inside each silo or sub-silo there is an upwardly narrowing gas distribution cone located at the bottom part for gas infeed. If an uniform feed silo is used, the central section of the sub-silo is also provided with a gas distribution cone. Gas is distributed to the gas distribution cone via a combustion chamber located in connection with each cone. Each cone has equipped with a great number of different sized nozzles. The nozzle ducts are located on the cone surface symmetrically across the whole circumference divided into several levels. The gas distribution cone in each silo or sub-silo can be changed separately, so that replacement of a cone only requires the process to be interrupted at the particular spot in the silo or sub-silo, the other silos and sub-silos can still feed material to the smelting furnace as normal. The essential features of this invention will become apparent in the enclosed patent claims.

In the gas distribution cone, the gas mixture with its final composition and temperature, is distributed directly to the nozzles located on the distribution surface of the gas distribution cone. The cone is placed in the central section of each sub-silo or silo so that it is advantageous for thermal economy, and distribution of the gas from the middle of the cone upwards occurs more evenly than in equipment of the prior art. The number of the nozzles in the gas distribution cone varies preferably between 100–500, depending on the pre-heating capacity required. The nozzles are mainly located horizontally, but preferably however slightly slanting downwards, whereby blocking of the nozzles due to smelting furnace feed ie. granular or lumpy solid matter flowing in the pre-heating furnace is minimized. The diameter of the nozzles is chosen according to the capacity and so that the speed of the gas is sufficient firstly to keep the nozzle free of the dust passing through the gas and secondly to create pressure in the gas distribution cone itself so that the distribution of gas is even and the penetrability to the feed bed is sufficient. Excessive speeds cause great wear and increased pressure loss.

The gas jets discharging from the gas distribution cone nozzles spread especially from inside the bed outwards. Estimating the penetrability of gas jets particularly in a rather coarse feed mixture is difficult. It is evident, that the dynamic pressure of the jet is significant, but speed itself is not necessarily decisive because even a single sizeable piece of ore coming forward can stop the jet discharging to the bed, possibly dividing it into several small sub-jets whose power will fade extremely rapidly.

According to the apparatus of this invention, gas which is fed via a gas distribution cone is conducted to the feed mixture as far as possible away from the cavities forming in the vicinity of the wall. In other words, the entire amount of gas has in any case to pass through the bed, whether it is directed directly to the bed surface or via the feed silo.

The gas distribution can be changed in vertical direction by adjusting the gas feed ratio in the distribution cone, i.e. the infeed can be boosted at the upper or lower part of the cone as required. An essential feature of the apparatus is that the gas distribution cone can be replaced, thus requiring only one part of the process to be shut down, while the rest of the process continues normally. For example, the surface of the feed mixture can be lowered so much in a silo or sub-silo that the cone can be replaced and other apparatus elements carry on functioning normally. In the apparatus of the prior art, cleaning the gas distribution openings requires the stoppage of the entire process up to the smelting furnace, since the distribution ducts are fixed and located in the bottom part of the feed silo. Because the repair work must be carried out inside the silo itself, the silo must be cooled down properly before anyone can enter.

When a large smelting furnace is being used, the pretreatment apparatus will preferably comprise several, e.g. three separate feed silos, which offer the following advantageous features: If there is a stoppage in the feed silo, infeed to the smelting furnace can take place using the remaining feed silos. Gas analysis can be performed individually, which is important from a process point of view. The use of several feed silos allows for the entire pretreatment apparatus construction to be lower than an apparatus of corresponding size, which saves construction costs (lower hall will etc). The use of separate feed silos enables a higher preheating degree, thereby improving the energy economy of the apparatus.

The pre-treatment apparatus pertaining to this invention is preferably prepared using pre-fabricated lined elements. During maintenance, the pre-fabricated element is easier to replace.

Figure 2:
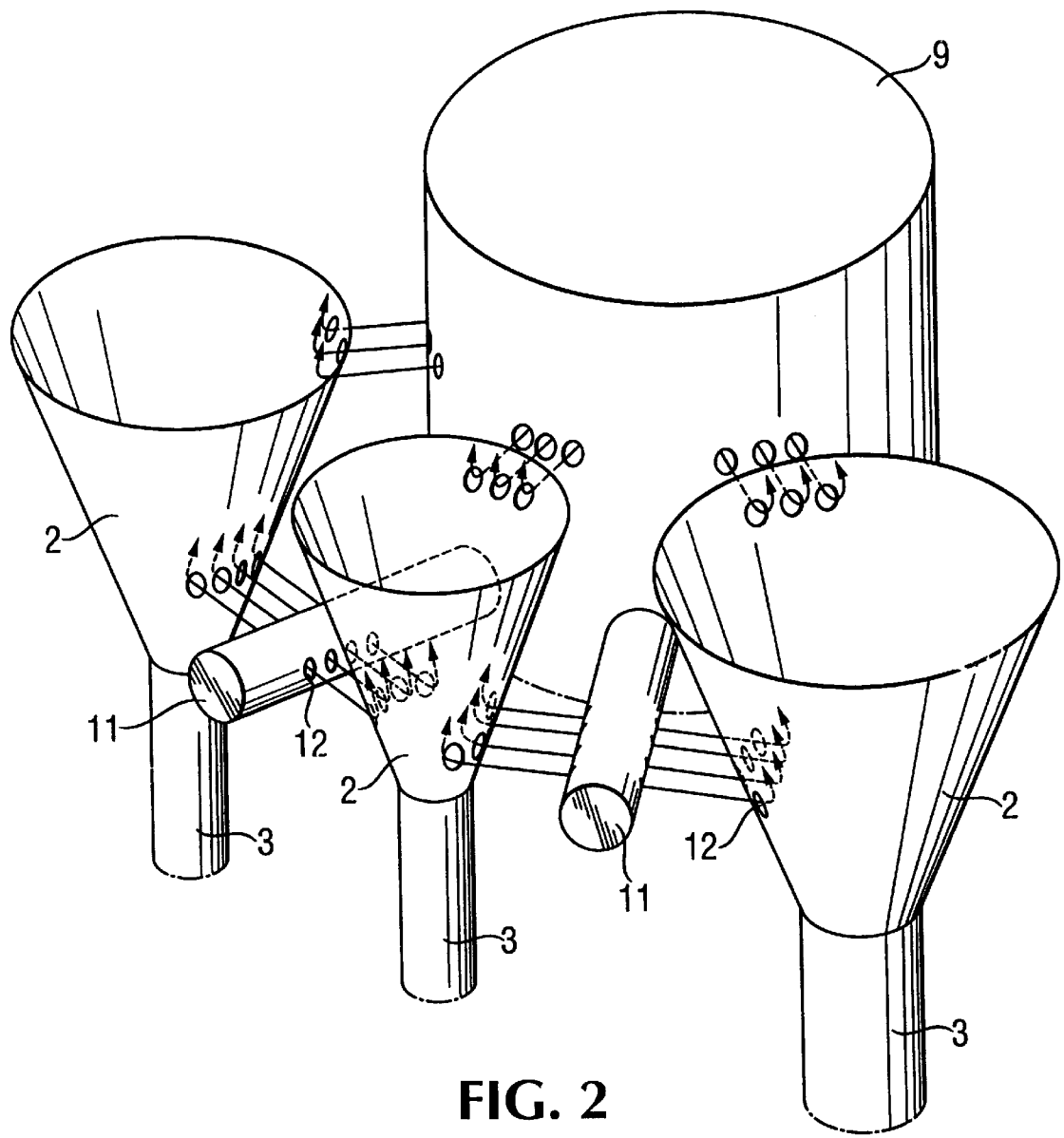
Figure 3:
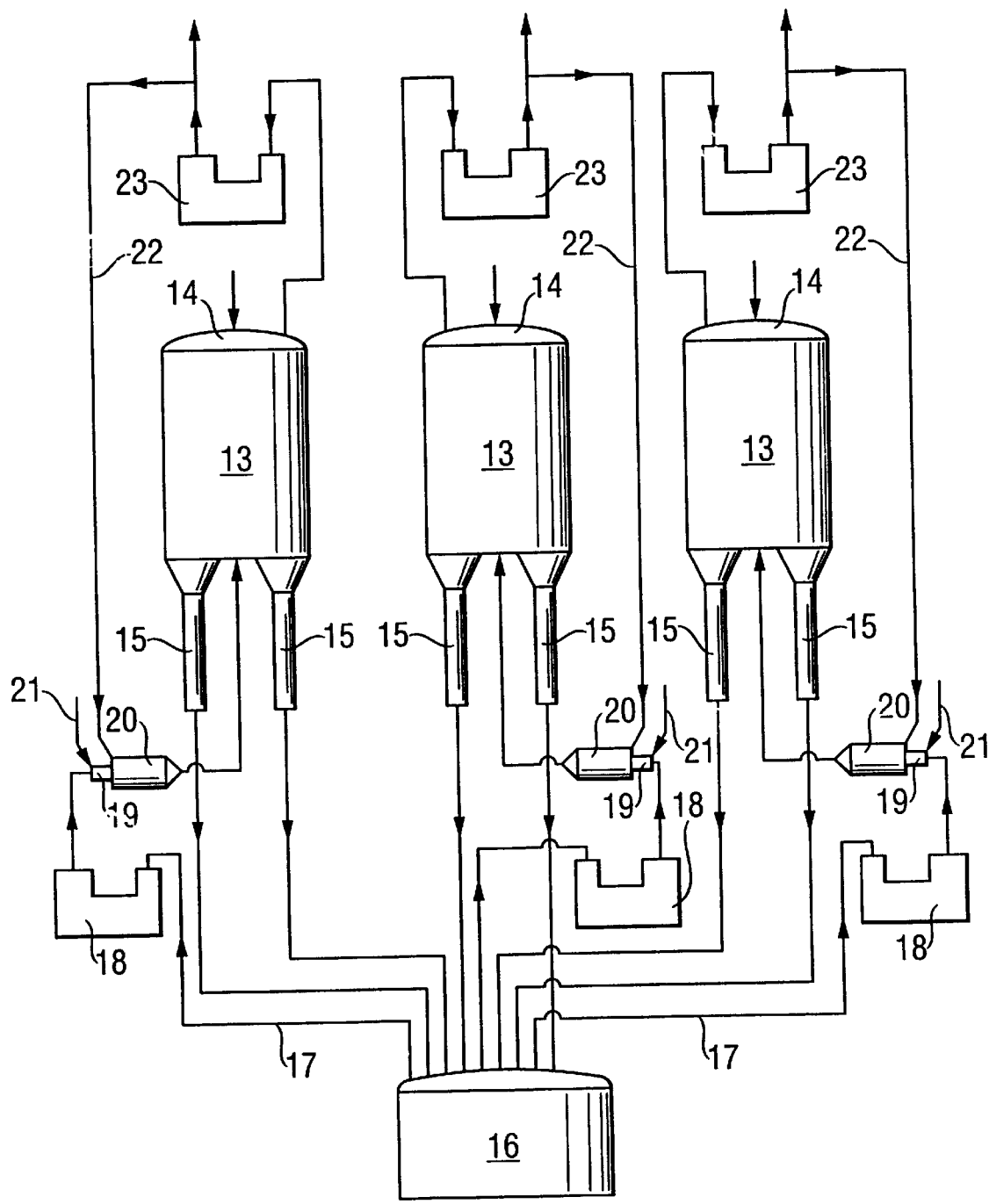
Figure 4A:
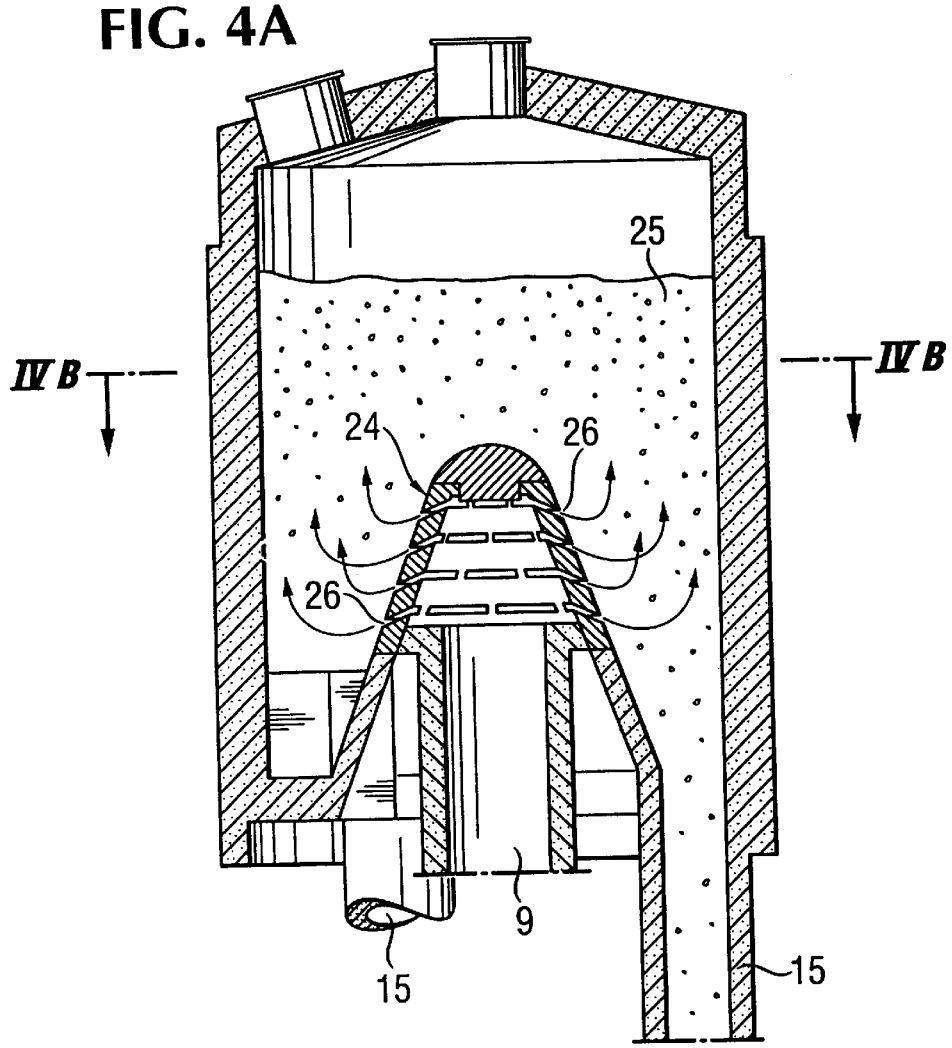
Figure 4B:
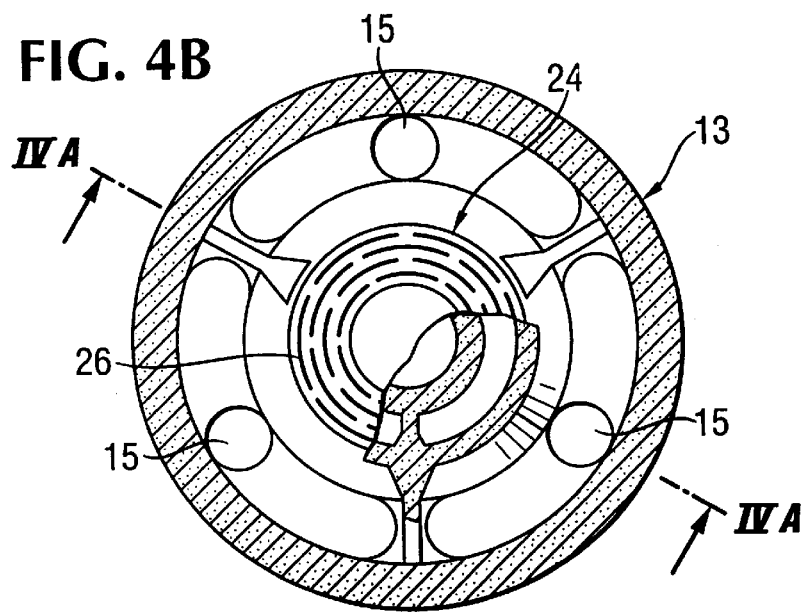
Figure 5:
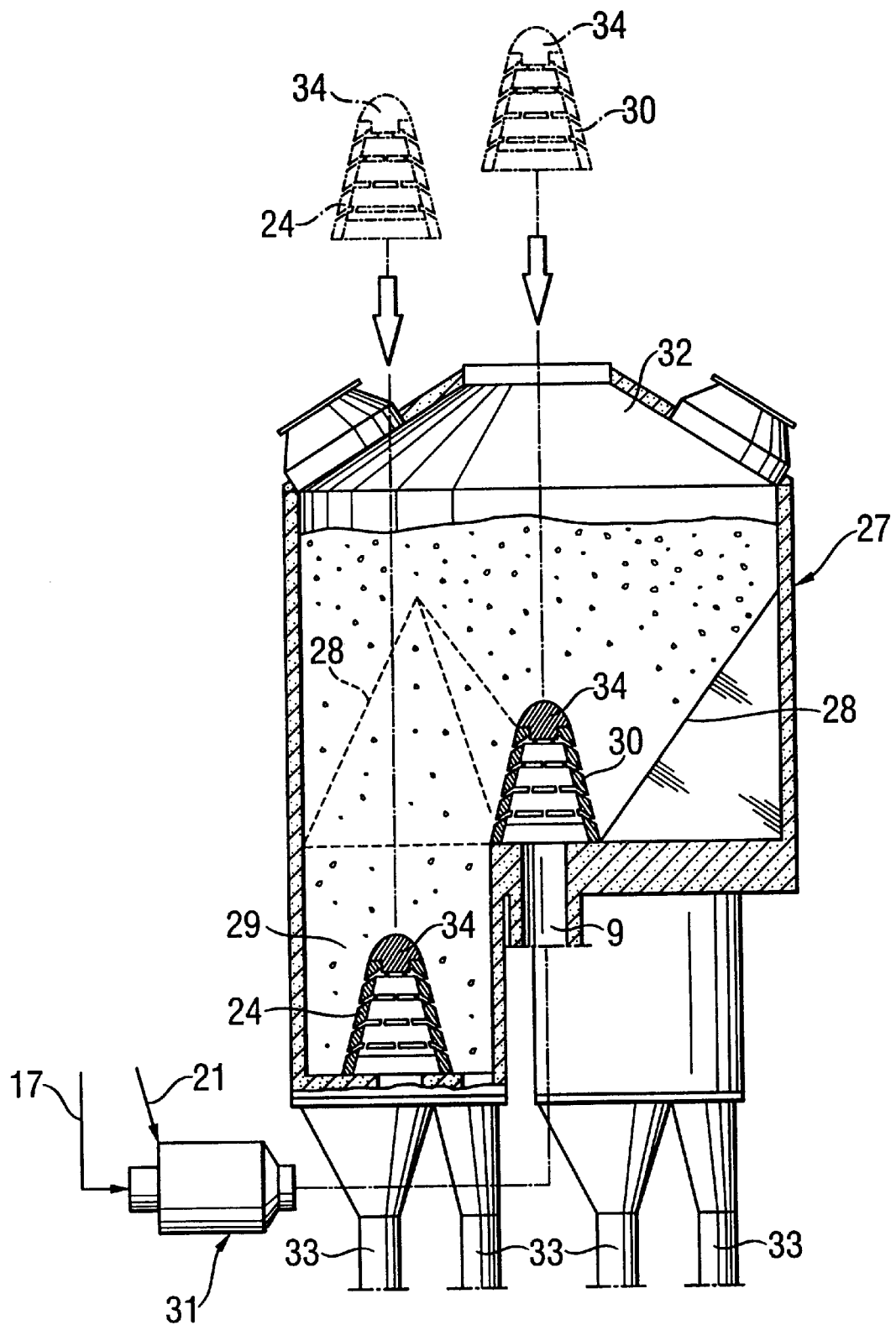

The apparatus described in this invention is described in more detail in the appended figures, where FIGS. 1 and 2 present apparatus of the prior art, where FIG. 1 is a schematic diagram of the whole apparatus and FIG. 2 a basic drawing of the gas distribution cone, FIG. 3 presents a schematical diagram of the entire apparatus according to the invention when the apparatus is comprised of several separate silos, FIG. 4A is an illustration in vertical cross-section of one silo with a multi-silo arrangement, FIG. 4B is a cross-sectional diagram of 4A, and FIG. 5 presents the apparatus pertaining to this invention in vertical cross-section, when it comprises a single feed silo, divided in the lower part into sub-silos.

The figures presenting prior art are equipped with own numbers, differing from U.S. Pat. No. 4,708,640. Thus, in FIG. 1 it can be seen that granular or lumpy material conducted to feed silo 1 is mixed and homogenized before being conducted to the silo. The lower part of the silo is divided into several sub-silos 2, which in turn are connected to ducts 3 that channel the preheated material to the proper smelting furnace 4. The CO-containing gases 5 discharging from the smelting furnace 4 are cleaned in a scrubber 6 and conducted on for example to a burner 7, into which a sufficient amount of oxygen is introduced. The combustible gas mixture is burned in a combustion chamber 8, which is uniform to the whole silo and the formed gas mixture is then conducted to a gas distribution chamber 9, located in the middle of the lower part of the silo. Circulating gas can also be introduced to the gas mixture to regulate the temperature of the gas. The gas exiting from the gas distribution chamber is distributed to each of the sub-silos. The exhaust gas exiting from the top of the feed silo is washed in a scrubber 10, part of the gas is dried for recirculation into the process and part removed from the process.

In the schematic cross-section of FIG. 2, it can be seen in detail how the gas flows exiting the gas distribution chamber 9 are distributed via exit nozzles 12 of the distribution ducts 11 from the sub-silo walls to the material bed when the ducts are located between sub-silos 2. Part of the gas can also be fed from the upper part of the gas distribution duct directly to the upper part of the silo without the distribution ducts. However, the gas is always fed from the walls of the sub-silo and not from the middle section.

FIG. 3 is a schematic diagram of the apparatus arrangement of the present invention, where the feed apparatus consists of several separate silos. Feed silos 13 are supplied with granular or lumpy material to be heated via the upper part of silo 14 flowing to the bottom of the silo, from where it flows through ducts 15 fixed to the lower part of the silo and on to a smelting furnace 16 located below. The schematic diagram is simplified and laid out so that the silos have been clearly drawn separately, although in practice they are all located on top of the smelting furnace, and ducts 15 lead directly to the smelting furnace. There are several ducts 15, typically three per silo. CO gas 17 discharging from the smelting furnace 16 is conducted preferably to the numerous scrubbers 18, and preferably the number of scrubbers and feed silos will be equal. From the scrubbers, the gas is conducted on to a burner 19 and a combustion chamber 20. The number of these chambers should be equal to the number of gas distribution cones in the apparatus, which facilitates the control and adjustment of the process considerably.

As in the apparatus of the prior art, a sufficient amount of oxygen or oxygen-containing gas 21 is introduced to the burner in addition to CO gas and the gas is mixed with irculating gas 22 in the combustion chamber, so that the gas mixture after the combustion chamber is suitable to be conducted to the gas distribution chamber. Gas, which has flowed through the feed silo, is recovered at the top of the silo 14 and conducted to gas cleaning facility 23, from where the cleaned gas is partly recirculated and partly discharged.

FIGS. 4A and 4B illustrate a silo of the previously described apparatus in more detail. In the middle of the bottom part of the silo 13 is a gas distribution cone 24, into which hot gas is conducted from its own combustion chamber, and through which all gas is conducted to the silo.

The granular or lumpy material to be heated 25 flows first as a uniform flow from the top downwards and annularily around the cone 24. A cylindrical form of the silo is preferable from the point of view of the bed material flow. Infeed to the smelting furnace usually occurs through several ducts 15, one of which is shown in FIG. 4A and the cross-section of FIG. 4B shows all three ducts of this arrangement. It can also be seen in the diagram that the cone 24 is equipped with a great number of gas nozzles 26, which are on different levels in the cone and through which gas is fed to the material bed. Viewed from above, the nozzle openings form a perforated area in grate formation, extending over a large surface area. As previously stated, the nozzles are preferably placed in an essentially horizontal manner, however somewhat slating downwards so that granular material to be heated cannot block them.

The apparatus presented in FIG. 5 shows a feed silo comprising single large silo 27, divided at the bottom via partial intermediate walls 28 into several, preferably three, sub-silos 29. This means that the uniform upper part of the silo is divided into several sections, sub-silos, each of which containing the gas distribution cone 24 inside. The lower part of the sub-silos is preferably cylindrical. The sub-silos are located on the walls of the uniform silo 27 and the space remaining between the sub-silos is provided still with a gas distribution cone 30, through which gas to bed fed heats the bed material in the uniform space in the silo. Each gas distribution cone is equipped with its own combustion chamber 31, through which has is conducted to the cone. Gas to be fed via the gas distribution cones to the silo exits from the upper part of the silo 32 and is conducted to be cleaned and thereafter partly recirculated, as previously described. The preheated granualr or lumpy material is discharged from the lower part of the silo via fixed ducts 33, preferably via several ducts per a sub-silo, on to the smelting furnace.

The gas distribution cones 24 and 30 located in all silos are preferably equipped with a rounded, specially manufactured protective tip 34. The entire gas distribution cone or just its protective tip, are removable and replaceable, as can be seen in FIG. 5. In practice, most often the entire gas distribution cone is changed when the nozzle openings are to be cleaned. The surface of the bed material to be fed is lowered so much that either the central cone 30 can be replaced, or in a particular silo or sub-silo, the bed material surface is lowered so that the distribution cone 24 can be removed and replaced. When the apparatus comprises several silos, replacing the cone or protective tip is even easier than in a single-silo arrangement. It is evident that a purpose-built apparatus has been developed for the replacement.

What is claimed is:

1. Apparatus for treating granular or lumpy material prior to feeding same to a smelting furnace, said apparatus comprising a plurality of cylindrical feed silos having a single upwardly narrowing gas distribution cone located in the central section of the bottom portion of each silo, said silos being connected at the bottom by ducts to a smelting furnace, and the gas distribution cones (24) are furnished with a replaceable protective tip (34).

2. Apparatus according to claim 1, characterized in that the distribution cone (24) is furnished with gas nozzles (26).

3. Apparatus according to claim 2, characterized in that the number of the nozzles (26) in the distribution cone (24) is between 100 and 500.

4. Apparatus according to claim 2, characterized in that the gas nozzles (26) are essentially directed sidewards.

5. Apparatus according to claim 2, characterized in that the gas nozzles (26) are directed slanting downwards.

6. Apparatus according to claim 2, characterized in that the gas distribution cone (24) and the gas nozzles (26) are placed symmetrically on the surface of the distribution cone at several levels.

7. Apparatus according to claim 1, characterized in that the gas distribution cones (24) are replaceable.

8. Apparatus according to claim 1, characterized in that the feed apparatus comprises at least three separate feed silos (13), each of which is furnished with the gas distribution cone (24).

9. Apparatus according to claim 1, characterized in that the feed silo (27) which is uniform at the top is divided at the bottom part by intermediate walls into at least three separate sub-silos (29).

10. Apparatus according to claim 9, characterized in that the central section of the feed silo divided into sub-silos is furnished with a gas distribution cone (30).

11. Apparatus according to claim 10, characterized in that each silo (13) or sub-silo (29) is furnished with its own combustion chamber (20, 31).

12. Apparatus according to claim 1, characterized in that each gas distribution cones (30), is furnished with its own combustion chamber (31).

* * * * *

UNITED STATES PATENT AND TRADEMARK OFFICE
CERTIFICATE OF CORRECTION

ATENT NO. : 6,099,301

DATED : August 8, 2000

INVENTOR(S) : MATTI ELIAS HONKANIEMI et al:

It is certified that error appears in the above-identified patent and that said Letters Patent is hereby corrected as shown below:

Title page, first column, in lines 2 and 5 of "[75] Inventors:", change "Turin" to --Tornio--.

Signed and Sealed this

Twenty-fourth Day of April, 2001

Attest:

NICHOLAS P. GODICI

Attesting Officer

Acting Director of the United States Patent and Trademark Office